March 28, 1933.                    P. SPENCE                    1,903,248
                                    VALVE
                            Filed March 12, 1929

INVENTOR.
Paulsen Spence
BY
ATTORNEYS.

Patented Mar. 28, 1933

1,903,248

UNITED STATES PATENT OFFICE

PAULSEN SPENCE, OF ORANGE, NEW JERSEY

VALVE

Application filed March 12, 1929. Serial No. 346,347.

My invention relates to a valve, and more particularly though not exclusively to a reducing type of valve.

Heretofore, much difficulty has been experienced in maintaining a tight joint in ammonia expansion valves and the like, due to the fact that the throttling action of the valve occurs between the seat and the valve member proper, and either the valve or the seat, or both, may be eroded by the passage of high pressure fluid. Ammonia valves and seats are likely to frost up due to the expansion of the gas at the valve seat and valve. Other difficulties have been in providing a valve in which the parts may be readily accessible for renewal or repair.

It is the principal object of the present invention to provide a valve wherein the throttling action does not take place at the valve seat, or the valve, whereby a tight joint may be maintained for indefinite periods.

It is a more specific object to provide a valve permitting a predetermined restricted flow of fluid independently of and less than would be permitted by the valve upon maximum opening.

It is another object to provide a valve in which certain parts are readily accessible for renewal or repair.

Briefly stated, in a preferred form of the invention, I employ a valve body having high and low pressure sides as usual. A valve seat portion is provided between the high and low pressure sides of the valve body, and a valve cooperates with the seat to form a tight seal when the valve is closed. The valve member or the valve seat portion, or both, may be provided with a restricted opening or openings of a cross-section smaller than the cross-sectional area between the valve seat and valve when the latter is open whereby the throttling action of the valve takes place through said passage or passages, and erosion of the valve seat and the valve member proper will be minimized. The valve body may be provided with a sediment cup and strainer, which members may be readily removed and interior parts of the valve exposed for renewal or repair.

In the drawing which shows, for illustrative purposes only, preferred forms of the invention—

Figure 1:
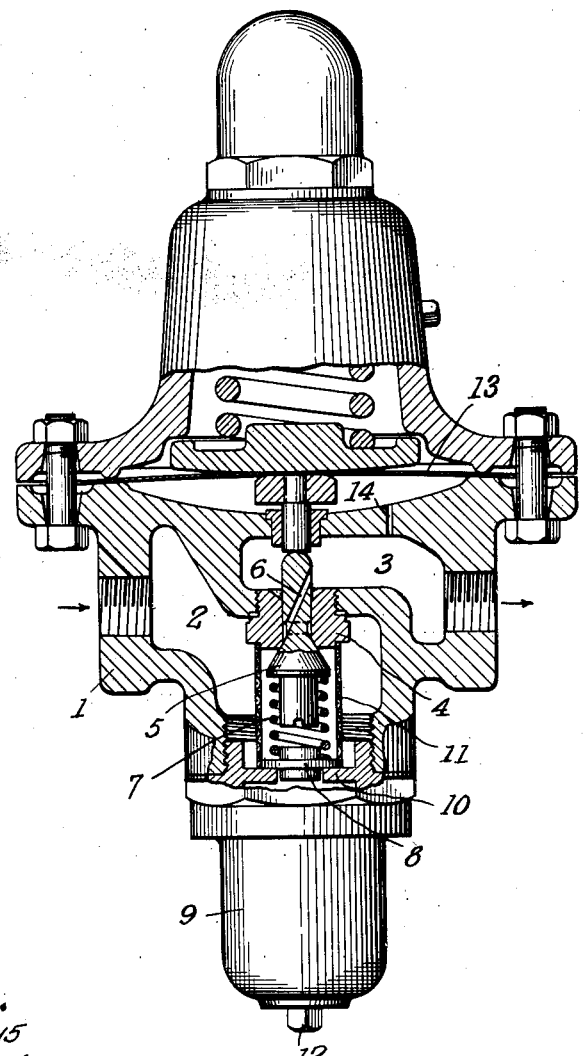
Fig. 1 illustrates a reducing valve in partial section, and particularly though not exclusively adapted as an ammonia expansion valve.

In said drawing, 1 indicates a valve body having a high pressure side 2 and a low pressure side 3. Between the high and low pressure sides of the valve body is a seat member, which in the form shown is a separate seat plug 4 threaded into the partition. The valve member 5 coacts with the seat for maintaining a tight seal between the high and low pressure sides of the valve, when the valve member is seated.

The valve seat or the valve member, or both, but as shown the valve member only, may be provided with a restricted passageway as 6 constantly open to one side of the valve as the low pressure side 3. The opposite end of the passage 6 is sealed from the high pressure side 2 when the valve member 5 is seated. When the valve member 5 is off of its seat, the passage 6 is in open communication with both the high pressure side 2 and the low pressure side 3. The passage 6 is of predetermined cross-section smaller than the area between the valve member 5 and its seat 4 when the valve is in open position. Therefore, the throttling action of the valve will take place in the passage 6 and not between the valve member 5 and its seat. Thus, the erosion accompanying the flow of high pressure fluid will be minimized at the valve proper and its seat, and will substantially all occur in the passage 6. Therefore, the valve member and its seat will remain in perfect condition and be capable of effecting a satisfactory seal for a much longer period than if the throttling action took place directly between the valve 5 and its seat 4. When the valve is used as an ammonia expansion valve, the expansion occurs in the chamber 3 and beyond the valve and its seat so that the latter are not likely to become frosted.

In a reducing valve, such as is disclosed herein for illustration, I prefer to urge the valve 5 towards its seat by means of a spring 7. The spring may engage the valve 5 and be supported at the opposite end by a spring abutment 8, which may be carried by a removable sediment cup 9. In the form shown, the sediment cup is provided with supporting lugs 10 for supporting the valve abutment 8.

I also prefer to surround the valve with a suitable strainer. In the form shown, the strainer 11 is of cylindrical form and abuts the valve seat 4, and may surround the spring abutment 8 and be supported from the sediment cup 9. Any sediment held back by the strainer 11 may fall between the lugs 10—10 and into the sediment cup 9 and be removed through a cleaning plug 12.

When it is necessary to open the valve for inspection or repair, the entire sediment cup 9 may be unscrewed from the valve body 1 and removed. The strainer and spring are preferably removable with the sediment cup 9, and the valve 5 may also drop out upon removal of the sediment cup. The seat plug 4 may be provided with an angular shaped portion to be received in and removed by a socket wrench inserted through the opening left upon removal of the sediment cup. Inspection, cleaning, and repair of the valve may thus be greatly facilitated.

The valve 5 may be actuated by means of a spring-pressed diaphragm 13 arranged in the manner usual for reducing valves. A passage 14 affords communication between the low pressure side 3 and the pressure side of the diaphragm 13 so that the pressure will raise the diaphragm and permit the valve 5 to close and remain closed until the pressure drops sufficiently for the spring-pressed diaphragm to again open the valve. The passageway 14 in practice is very small so as to cause the diaphragm to have a dash-pot action to prevent fluttering of the valve.

Figure 2:
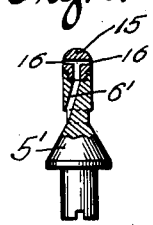
Fig. 2 is a modified form of valve member.

In the modification shown in Fig. 2, the valve 5' is provided with a passageway 6' corresponding in general to the passage 6. A removable plug member 15 is attached as by screw threads to the valve 5', and is provided with one or more restricted passages 16—16 communicating with the main passage 6'. Thus, by applying plugs 15 having restrictions of proper size, any desired throttling effect may be produced within the limits determined by the size of the main passage 6'.

While the invention has been described in considerable detail and one specific embodiment illustrated, I do not wish to be strictly limited to the form shown since many different embodiments of the invention may be made and certain features utilized in connection with valves of wholly different types.

I claim:

1. In a valve, a valve seat member, a valve member cooperating therewith, said valve member having a passageway therethrough, a removable member secured to said valve and having a restricted passageway in communication with said first mentioned passageway, whereby when said valve is off its seat pressure fluid may pass between said valve and seat and be throttled through said restricted passageway in said removable member.

2. In a valve, a valve seat, a valve member cooperating therewith to form a tight seal through said seat, a removable member connected to one of said members and having a restricted passage therein connecting spaces at opposite sides of said seat when said valve member is open, said passage having a cross-section smaller than the cross-section of the space between said valve member and said valve seat when the valve is open.

3. In a reducing valve, a valve body having a high pressure side and a low pressure side and having a valve seat therein, a valve member coacting with said valve seat to open and close a passage between said valve member and said valve seat, said valve member having a restricted passage to conduct fluid from the high pressure side to the low pressure side of said valve when said valve is open, said second mentioned passage having a cross-section smaller than the cross-section of said first mentioned passage when said valve is open, said second mentioned passage constituting the sole channel for conducting fluid to the low pressure side of said valve, said first mentioned passage constituting the sole channel for conducting fluid from the high pressure side of said valve to said second mentioned passage, and spring means for urging said valve in one direction.

4. In a reducing valve, a valve body having a high pressure side and a low pressure side and having a valve seat therein, a valve member coacting with said valve seat to open and close a passage between said valve member and said valve seat, said valve member having a restricted passage to conduct fluid from the high pressure side to the low pressure side of said valve when said valve is open, said second mentioned passage having a cross-section smaller than the cross-section of said first mentioned passage when said valve is open, said second mentioned passage constituting the sole channel for conducting fluid to the low pressure side of said valve, said first mentioned passage constituting the sole channel for conducting fluid from the high pressure side of said valve to said second mentioned passage, a diaphragm for regulating the position of said valve member relatively to said valve seat, and means for leading fluid under pressure to one side of said diaphragm.

PAULSEN SPENCE.